United States Patent [19]

Cox, Jr.

[11] Patent Number: 4,577,522
[45] Date of Patent: Mar. 25, 1986

[54] TORSIONAL THRUST TOOL

[76] Inventor: James D. Cox, Jr., 250 Morrison Canyon Rd., Fremont, Calif. 94538

[21] Appl. No.: 622,268

[22] Filed: Jun. 19, 1984

[51] Int. Cl.⁴ .................. F16H 27/02; F16H 31/00
[52] U.S. Cl. .................................................. 74/127
[58] Field of Search ......................................... 74/127

[56] References Cited

U.S. PATENT DOCUMENTS

| 756,388 | 4/1904 | May | 74/127 |
| 1,208,115 | 12/1916 | Eynon | 74/127 |
| 1,213,733 | 1/1917 | Braunbeck | 74/127 |
| 1,259,926 | 3/1918 | Stump | 74/127 |
| 1,497,479 | 6/1924 | Booth | 74/127 |
| 4,249,617 | 2/1981 | Cox, Jr. | |

FOREIGN PATENT DOCUMENTS 495040  6/1919  France .................................. 74/127

Primary Examiner—Lawrence J. Staab
Attorney, Agent, or Firm—Manfred M. Warren; Robert B. Chickering; Glen R. Grunewald

[57] ABSTRACT

A rotary hand tool driven by reciprocal thrusts of a handle in which reciprocal motion is caused by extensions from a rotating shaft assembly engaged with elongated, axially spaced helical slots in a housing coaxial with the shaft and fixed to the handle.

4 Claims, 9 Drawing Figures

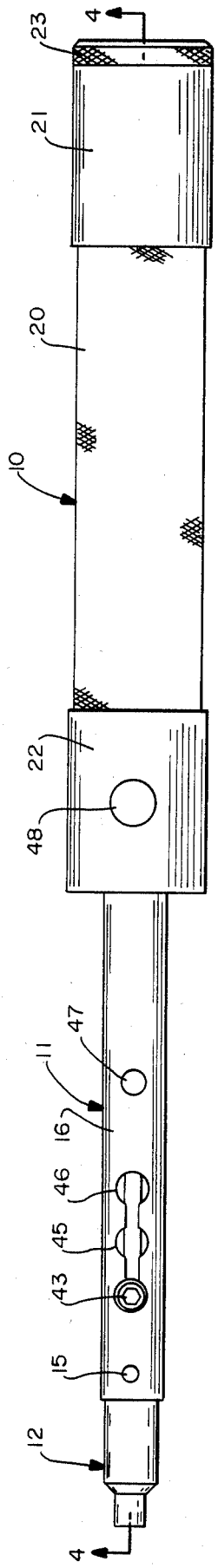
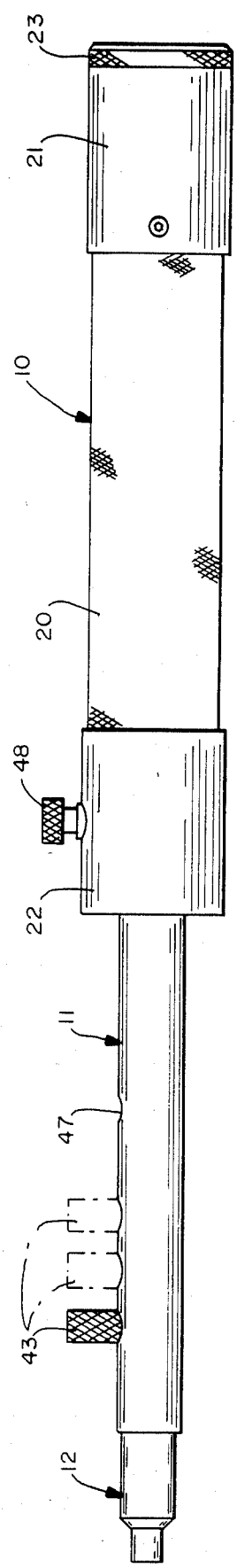
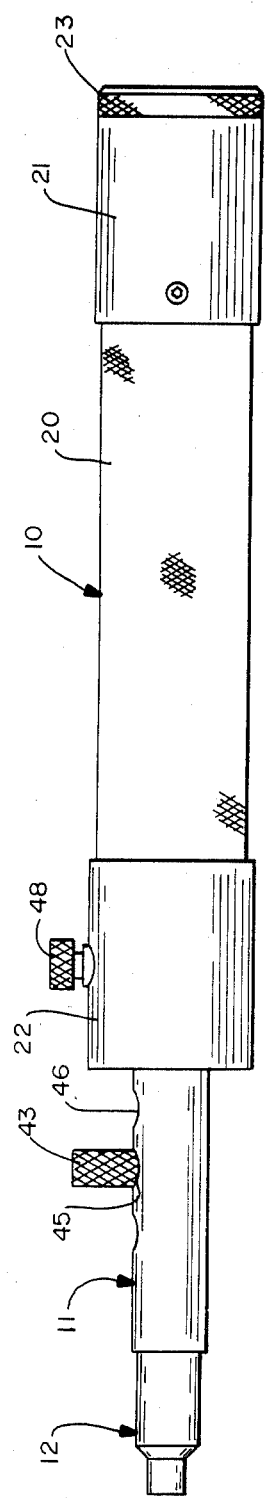

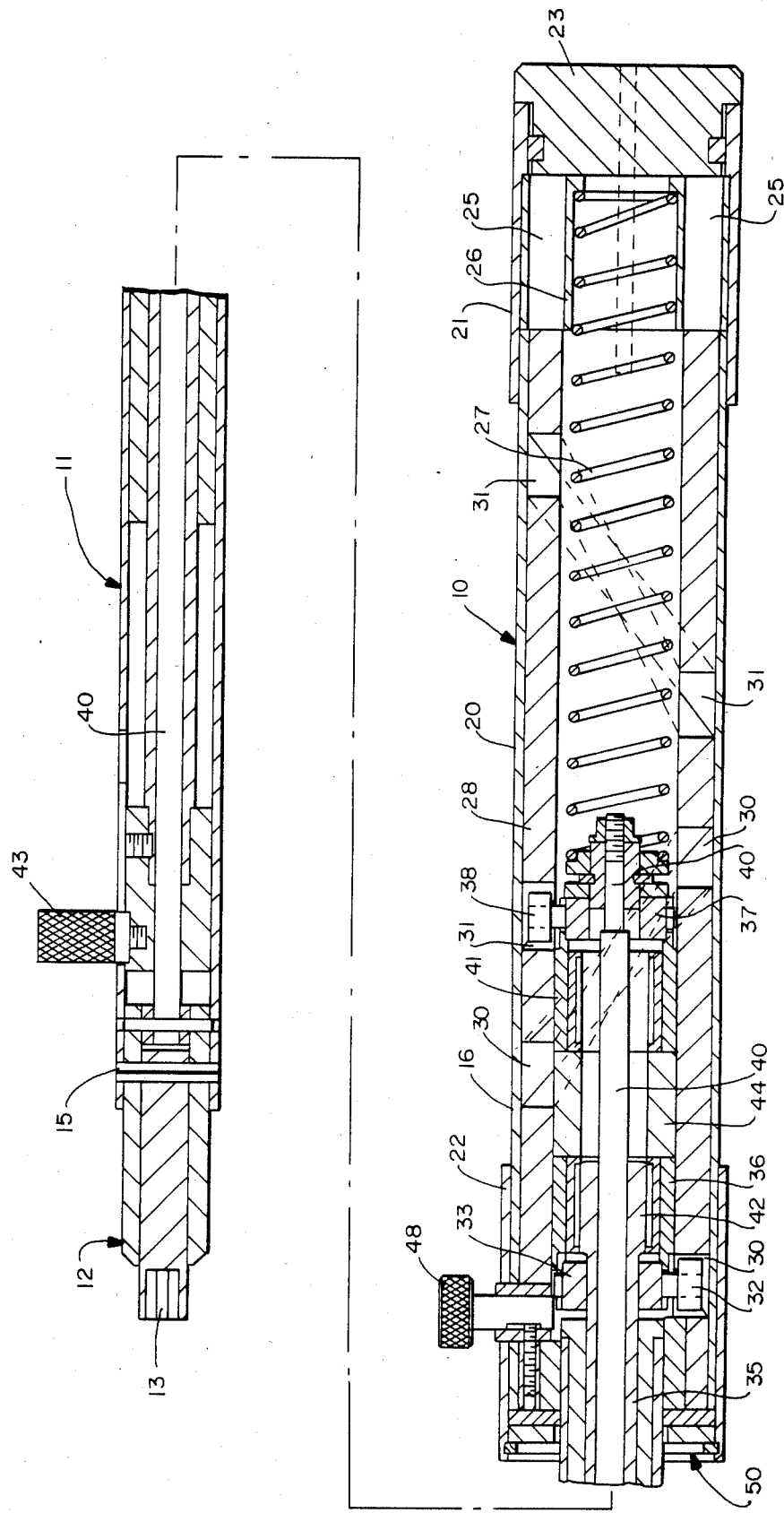
FIG.—4

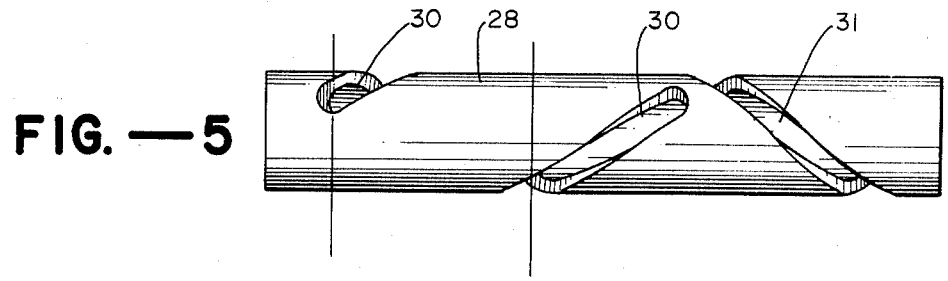
FIG.—5
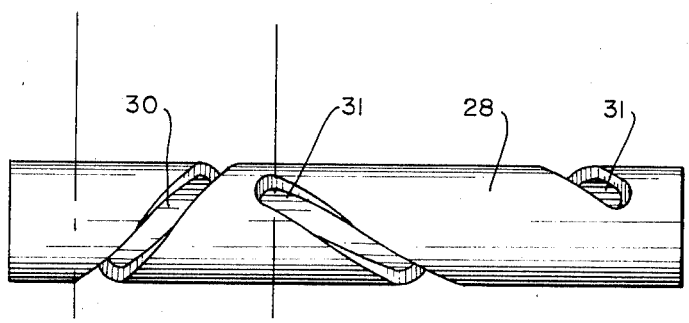
FIG.—6
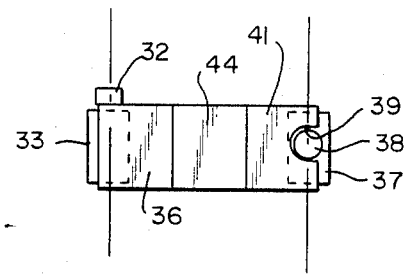
FIG.—7
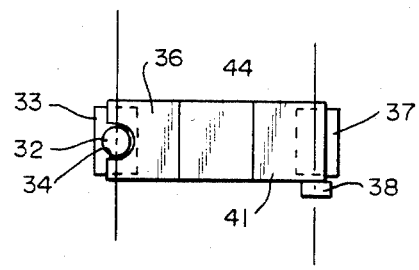
FIG.—8
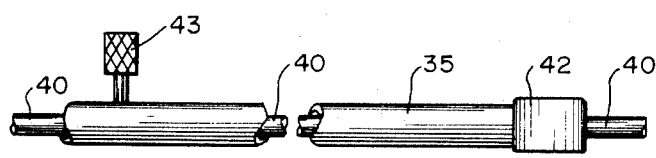
FIG.—9

4,577,522

TORSIONAL THRUST TOOL

FIELD OF THE INVENTION

This invention is a hand tool that produces high torque, rotational motion by the reciprocal movement of a handle.

BACKGROUND OF THE INVENTION

Hand tools that use reciprocating linear motion to produce rotational motion are known. Typical of these are the well known screwdrivers with helical grooves in an operating shaft. Among the problems with screwdrivers of that type are that the helical grooves around the operating shaft are exposed and they become dirty which greatly increases friction during operation of the tool with a corresponding reduction in torque that can be generated from operating the handle. In addition the helical grooves require lubrication which in turn causes the tool to have an exposed, oily shaft that is dirty and sticky enough to readily pickup dust and soil. The exposed helical grooves also are a danger in that an operator's skin can be caught between the handle and the rotating helical shaft. The greatest problem with such tools is that high torque cannot be obtained because the torque-producing components must operate with a lever arm that is equal to or less than the radius of the operating shaft.

U.S. Pat. No. 4,249,617 discloses a torque producing tool which mitigates many of the problems of tools having an exposed helical groove on the operating shaft. Rather than employing helical grooves on an operating shaft the tool disclosed in U.S. Pat. No. 4,249,617 employs a smooth shaft surrounded by a concentric housing having helical slots through which projections from the shaft protrude. Thus, moving the housing with reciprocal motion causes the shaft to rotate. The device can be made with bearings on the projections and resultant low friction operation does not diminish the torque produced by the reciprocal motion of the housing containing the helical slots. In addition, the housing can be made of a material such as nylon or polyvinylchloride that have natural lubricity.

The housing may also be spaced quite far from the center of the operating shaft whereby mechanical advantage is greaty increased by the length of the extensions from the operating shaft.

Although the device disclosed in U.S. Pat. No. 4,249,617 mitigates the problems found in tools having helical grooves on the operating shaft, its particular construction causes others. In order to have a tool that can rotate both clockwise and counterclockwise it is necessary to have two helical slots which run in opposite directions. On the familiar tools having helical grooves on the operating shaft the grooves simply intersect. However, in order to have opposite helical slots in a surrounding housing it is necessary that the slots do not intersect in that such intersections would weaken the housing. With the tool of U.S. Pat. No. 4,249,617 the slots are placed so that they do not intersect but in so placing the slots each thrust of the housing can only produce about 180° of rotation in the shaft. It is desirable to have each thrust of the housing produce a 360° rotation of the shaft and it is also desirable, in order to produce high torque, to have the force causing reciprocal motion of the handle to be capable of accepting the entire body weight of the operator whereas in the tool disclosed in U.S. Pat. No. 4,249,617 motivating force causing reciprocating motion of the housing is limited to the force of the operator's hand grip.

SUMMARY OF THE INVENTION

This invention is a hand tool wherein the operating shaft is a smooth piece of metal that enters a handle through a sealed opening that not only prevents the operator from having his hand caught in any moving part of the device but further keeps all of the moving parts of the device except the smooth rotating operating shaft shielded from dust, dirt, corrosive environments or the like. In addition, each forward thrust of reciprocal motion of the handle of the tool of this invention can cause substantially 360° rotation of the operating shaft and the very high torque produced on the operating shaft results from use of the full body weight of the operator transmitted through the high mechanical advantage of the helical slots in a housing spaced far from the center of the operating shaft. In use of the tool of this invention it has been found that high enough torque can be produced to drive a screw or tighten a threaded fastener fully without resorting to a final tightening with rotary motion of the hands as is usually the case with similar tools that are known.

Basically, the tool of this invention employs an elongated housing containing two elongated helical slots, running in opposite directions whereby each helical slot will drive the operating shaft in a direction opposite the other. The housing is fixed within a handle and the two helical slots are axially spaced from one another whereby each helical slot can extend approximately 360° around the housing member without intersecting the other. The housing surrounds the working shaft that is mounted to rotate on its long axis and is operatively connected to the helical slots with two clutch members, one clutch member gripping the shaft when it rotates in one direction and the other gripping the shaft when it rotates in the other direction. The tool thus constructed can drive threaded fasteners or remove them.

DETAILED DESCRIPTION OF THE DRAWINGS

FIG. 1 is a plan view of a tool embodying this invention.

FIG. 2 is an elevation view of FIG. 1.

FIG. 3 is an elevation view of FIG. 1 in contracted position.

FIG. 4 is a cross-section of FIG. 1 taken along the line 4—4.

FIG. 5 is an elevation view of housing surrounding the operating shaft in the tool ill strated in FIGS. 1-4.

FIG. 6 is a view of FIG. 5 rota ed 180° along its long axis.

FIG. 7 is an elevation view of a pair of one way clutch elements used to connect the operating shaft to the helical slots in the housing.

FIG. 8 is a plan view of FIG. 7.

FIG. 9 is an operating shaft that may be used selectively to position either of the clutch elements illustrated in FIG. 7 to engage the operating mechanism or to position both in a neutral position.

The tool embodying this invention as illustrated in the drawings includes a handle assembly generally designated 10, an operating shaft assembly generally designated 11, and a bit holding tip generally designated 12. The bit holding tip is provided with a hexagonal recess 13 (FIG. 4) which is adapted to receive screwdriver bits or adapters for sockets or the like. In the illustrated embodiment the bit holding tip 12 is fixed to operating shaft 11 with a recessed fastener 15 such as a roll pin whereby shaft 11 and tip 12 rotate together.

Handle 10 includes a knurled outer cover 20 which terminates in a rear end cap 21 and a front cap 22. The rear cap 21 in the illustrated embodiment terminates with an end closure 23 which, in a preferred embodiment, is removable exposing a group of cavities 25 which are of a size and shape to hold tool bits such as screwdriver bits or socket adapters. Rear cap 21 is also adapted with an inner cylindrical sleeve 26 to hold the end of spring 27 that occupies an interior position within handle 10 and bears against the rear portion of operating shaft 11 to urge it toward its full extended position after a torque producing thrust has been made, as will be discussed in more detail hereinafter.

Also within handle 10 and concentric to outer cover 20 is a housing 28 that includes two helical slots 30 and 31 that can best be seen in FIGS. 5 and 6.

Within helical slot 30 there is an extension 32 from a bushing 33 that surrounds the rear portion of a hollow shaft 35. Extension 33 not only interlocks with helical slot 30 but it additionally interlocks with a cut out portion 34 on one way clutch 36. Clutch 36 is known to the art and commercially available. It includes rollers which, when in contact with a shaft, will permit the shaft to rotate independently in one direction but will grip the shaft when it rotates in the other direction.

A second bushing 37 having an extension 38 surrounds the rear portion of the operating shaft assembly 11, that rear portion being a small diameter shaft 40 that runs concentric to and within the hollow cavity of shaft 35 and extends beyond it. The extension 38 of bushing 37 engages a cut-out portion 39 of a one-way clutch 41 in the same manner as the extension 32 engages clutch 36. A spacer 44 surrounds shaft 35 and spaces clutch 36 and 41 a fixed distance from one another.

The relationships among the clutches, the bushings, the spacer and the extensions can best be seen in FIGS. 7 and 8. As assembled, as best shown in FIG. 4 the clutches are mounted within housing 28 with extension 32 extending into helical slot 30 and extension 38 extending into helical slot 31. The shaft 35 is mounted concentric to clutches 36 and 41 with an enlarged portion 42 engaged with one clutch, the other or neither clutch. An operating knob 43 is connected to shaft 35 so that it may be moved axially within clutchs 36 and 41 to be engaged with one, the other, or neither of them, not with both. The position of the enlarged portion 42 illustrated in FIGS. 7, 8 and 9 is one in which neither clutch element is engaged and the operating shaft 11 which is free to rotate independently of the handle 10. As best illustrated in FIGS. 1 and 2, the knob 43 protrudes through a slot in the exterior shell 16 of operating shaft 11, the slot having three preset positions. The preset positions are for rotating in one direction, rotating in the opposite direction, and being free to rotate independently of the handle assembly 10.

In the position shown in full in FIGS. 1 and 2, knob 43 is positioned so that the operating shaft assembly is engaged with clutch 36 which in turn is engaged with helical slot 30 which drives shaft assembly 11 to rotate in a clockwise direction, specifically to drive a righthand thread. When knob 43 is in position 45 the enlarged portion 42 is between the two clutchs, within spacer 44, and the shaft is in neutral. In the neutral position the shaft can rotate either clockwise or counterclockwise without a corresponding motion of the handle. When knob 43 is in position 46 it will drive the shaft counterclockwise which is a direction that will remove a righthand threaded fastener or drive a left hand threaded fastener.

Hole 47 is of a size to engage the bottom of the stem connected to knob 48 so that the tool of this invention may be held in its retracted position as illustrated in FIG. 3 by aligning hole 47 with the bottom of that stem and depressing knob 48. In the retracted position the tool takes up less space in a tool box and in the retracted position shown in FIG. 3 the handle and the operating shaft are locked together so that the tool may be used as a conventional screwdriver or nut driver. It is advantageous to put the knob 43 in the neutral position, as shown in FIG. 3, before locking operating shaft 11 in retracted position because shaft 11 can be moved without rotation or rotated independently of handle 10 in order to readily find an engaging position between hole 47 and the bottom of the shaft connected to knob 48.

In operation, one using the tool of this invention would first install a bit in cavity 13, such as a screwdriver bit. If it is desired to drive one or a number of threaded elements knob 43 would be placed in the position illustrated in FIG. 1. The threaded elements would be placed in a position at which they are to be driven, the tool engaged in cavity 13 would be positioned on the threaded element in driving position, and the handle 20 would be thrust forward.

With knob 43 in position shown in FIG. 1, enlarged portion 42 would be engaged in clutch 36 whereby the extension 32 would be engaged in helical slot 30 so that the forward thrust of handle 10 will turn operating shaft 11 in a clockwise direction. The tool of this invention is capable of producing very strong driving force because the whole weight of the operator's body can be employed to force handle 10 forward and because the portions of extension 32 engaged in helical slot 30 is radially far removed from the center of operating shaft 11 whereby great leverage to produce a torque is available. In addition, helical slot 30 has a long axial extent so that its cam like action to produce clockwise rotation of shaft 11 magnifies the torque available from each increment of linear motion of the handle. After the handle is thrust fully forward along shaft 11, releasing force on the handle permits spring 27 to urge handle 10 back to its original operating position for a second thrust. When handle 10 is urged backwards clutch 36 does not grip enlarged portion 42 so there is no engagement between it and shaft 11 on the return stroke and, as a result, shaft 11 does not rotate on the return stroke.

When righthand threaded elements are to be removed, or when lefthand threaded elements are to be driven, the knob 43 is positioned in position 46, the one furthest to the right illustrated in broken lines in FIG. 2. When knob 43 is moved into position 46 the shaft 35 slides axially along shaft 40 until enlarged portion 42 is in engagement with clutch 41. Clutch 41 is connected through extension 38 to helical slot 31 so that a forward thrust of handle 10 will cause shaft 35 to rotate in a counterclockwise direction or in a direction to drive a lefthand thread or to remove a righthand thread. In this position of shaft 35 clutch 36 is disengaged from enlarged portion 42. On the return stroke of the handle clutch 41 is free to rotate around enlarged portion 42.

In the illustrated embodiment a seal assembly 50 covers the forward opening of handle assembly 10 and engages in a slidable sealing relationship with the inner circumference of exterior shell 16 whereby all of the operating elements located within handle assembly 10 are shielded from the water, oil, dirt and other materials. Thus, the handle assembly may be operated under adverse conditions without having its critical moving parts interfered with by the environment. This is an important feature of a hand tool. Any lubrication of the moving parts within handle 10 will remain clean and free from abrasive contaminants. Seal assembly 50 includes a felt dust seal, a retainer and a snap ring to hold the assembly in place.

What is claimed is:

1. A reversible rotary torque-producing tool comprising:
   a. an elongated cylindrical handle;
   b. a cylindrical housing located completely within and concentric to said handle, said housing being fixed against relative motion with respect to said handle, having first and second helical slots in the cylindrical surface thereof with said slots being axially displaced from one another, with said first slot defining a right hand helix and said second slot defining a left hand helix each of said slots extending substantially 360° around said housing and with the end of said first slot being intermediate the ends of said second slot;
   c. a tool-operating shaft located within and concentric to said housing, said tool-operating shaft
      1. being journaled for rotating around its long axis,
      2. having a large diameter clutch-engaging part,
      3. having a small diameter part,
      4. having an extending part extending beyond said handle
   d. first drive means including a first clutch that grips in one direction of rotation and second drive means including a second clutch that grips in a direction of rotation opposite said one direction, said first drive means engaging said first helical slot and said second drive means engaging said second helical slot;
   e. shift means for selectively positioning said large diameter clutch-engaging part within one of said drive means; and
   f. a closure surrounding said extending part and enclosing said housing within said handle.

2. The tool of claim 1 having biasing means to urge said shaft toward its most extended position.

3. The tool of claim 1 wherein said helical slots travese at least 2.5 inches of the length of said housing.

4. The tool of claim 1 wherein said closure surrounds said operating shaft in sliding, sealing relationship.

* * * * *